Jan. 12, 1954          J. H. W. BEGEROW          2,665,900
       TORCH HOLDING ATTACHMENT FOR GAS CUTTING MACHINES
Filed Dec. 15, 1949                              4 Sheets-Sheet 1
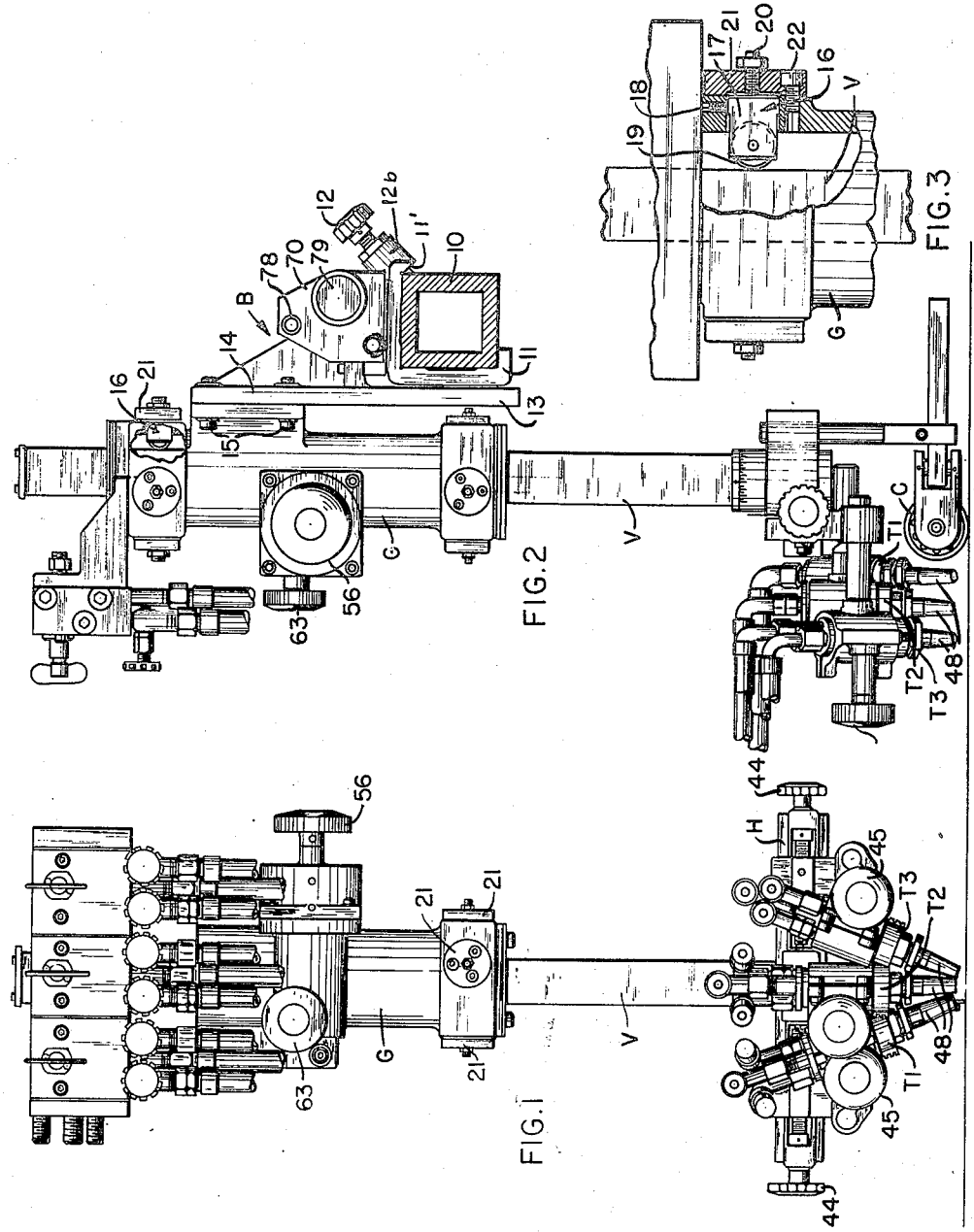
INVENTOR
JOHN H.W. BEGEROW
BY
ATTORNEYS

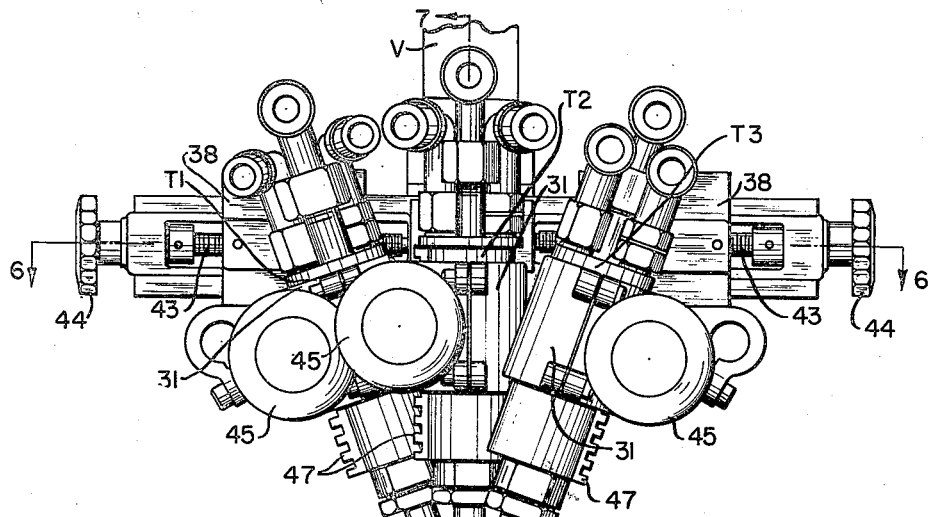
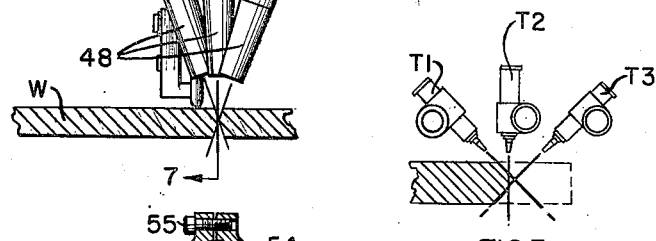
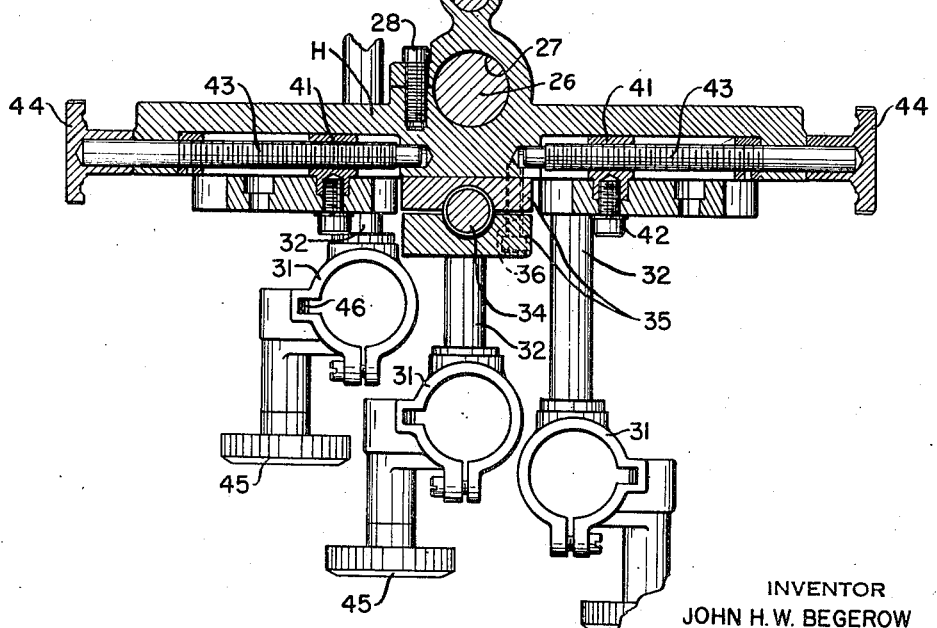

Jan. 12, 1954     J. H. W. BEGEROW     2,665,900
TORCH HOLDING ATTACHMENT FOR GAS CUTTING MACHINES
Filed Dec. 15, 1949     4 Sheets-Sheet 3

INVENTOR
JOHN H. W. BEGEROW
BY
ATTORNEY

INVENTOR
JOHN H. W. BEGEROW
BY
ATTORNEYS

Patented Jan. 12, 1954

2,665,900

UNITED STATES PATENT OFFICE 2,665,900

TORCH HOLDING ATTACHMENT FOR GAS CUTTING MACHINES

John H. W. Begerow, Wood-Ridge, N. J., assignor to Air Reduction Company, Incorporated, New York, N. Y., a corporation of New York Application December 15, 1949, Serial No. 133,067

11 Claims. (Cl. 266—23)

This invention relates to apparatus for thermo-chemically cutting metal by means of oxygen cutting torches. More particularly the invention relates to a torch holding attachment for gas cutting machines adapted to hold a plurality of torches in proper position for bevel cutting and preparing the edges of plates for subsequent welding.

To prepare plate edges for welding, and sometimes to prepare them for other purposes, it is often necessary to employ three torches, one for cutting the work to form a bevel along the upper edge of the prepared plate, one for cutting the work to form an oppositely inclined bevel along the lower edge of the prepared plate, and one for cutting the work to form a land that constitutes the extreme edge face of the prepared plate. The torches must be arranged and adjusted in a special way for each type of edge preparation depending upon the thickness of the plate, the desired angle of the bevels, and the width of the land. Since these factors vary considerably, many different torch arrangements and adjustments are required to take care of them all. There is therefore a demand for a single torch holding attachment for a gas cutting machine that will hold at least three torches and which will permit enough torch arrangements and adjustments to take care of any type of edge preparation which might be required and which will permit such arrangements and adjustments to be made easily, quickly and accurately, thus eliminating the present time-consuming and inconvenient practice of making up a special torch arrangement for each type of edge preparation by attaching individual torch holders to the cutting machine and obtaining the desired adjustments by whatever means happens to be available. The attachment should also have means whereby the spacing of the tips of the group of torches from the work surface is maintained constant, for this is important in bevel cutting because any variation in the spacing will affect the width of the bevels and the land. Such means should permit the required vertical movement of the group of torches to accomplish this while constraining the torches against any lateral movement of the kind that can result for instance from play in the supporting structure when the torches are supported by a folding parallelogram linkage as has already been proposed. It is therefore the principal object of this invention to provide a single torch holding attachment which will answer the above-mentioned requirements.

Certain special features of the invention are applicable to a torch holding attachment adapted to hold a greater or smaller number than three torches, and it is therefore an additional object of the invention to provide an improved type of torch holder attachment embodying these special features to be hereinafter described.

A torch holding attachment embodying the invention is illustrated in the accompanying drawings, in which:

Figure 1 is a front elevation of the attachment;

Fig. 2 is a side elevation of the attachment;

Fig. 3 is an enlarged elevation of the upper portion of the guide box in which the vertical bar of the attachment is slidably mounted, a portion of the guide box being broken away to show the construction of one of the roller bearings mounted in the guide box;

Fig. 4 is an enlarged front elevation of the lower portion only of the attachment;

Fig. 5 is a schematic representation of the torches positioned for cutting a double bevel and land;

Fig. 6 is a horizontal section taken approximately along line 6—6 of Fig. 4 with the torches removed;

Referring first to Figs. 1 and 2, the complete torch holding attachment comprises the following principal parts: a special bracket B (Fig. 2) having a clamping portion adapted to be clamped to some part of a gas cutting machine such as the usual torch bar, and serving to pivotally support the attachment so that it can be swung either to an operative or an inoperative position, the bracket having means whereby fine adjustment of the attachment and its group of torches can be made laterally of the line of cut and lengthwise of the torch bar without moving the clamping portion of the bracket along the torch bar; a guide box G secured to the bracket;

a vertical bar V rectilinearly movable in the guide box; a horizontal guide bar H (Fig. 1) connected to the lower end of the vertical bar so that it can be turned about the axis of the vertical bar in a horizontal plane when desired; three torches $T^1$, $T^2$ and $T^3$ mounted on the guide bar H, the torches being relatively adjustable transversely of the line of cut, i. e., transversely of the direction in which the torches are moved by the cutting machine, and each torch being independently adjustable forwardly or rearwardly in the direction of the line of cut and also angularly; and a caster wheel C (Fig. 2) adapted to roll on the work surface and operatively connected to the vertical bar V to slide it in the guide box G when there are irregularities in the work surface to thereby keep the torch tips spaced a constant distance from the surface of the work-piece.

In Fig. 2 of the drawings the attachment is shown clamped to a member 10 which may be assumed to be the usual torch bar of a cutting machine, or any other part thereof to which the attachment can be conveniently clamped and which will move the torches at uniform cutting speed along the proposed line of cut (to the right or left as viewed in Fig. 2). The drawings show the part 10 of the cutting machine as having a square cross-section because this is the usual cross-sectional shape of the torch bar of most gas cutting machines, and the clamp portion 11 of the bracket B is shown shaped accordingly, but it should be understood that the particular nature of the clamp portion of the bracket will depend upon the nature of the part of the cutting machine to which it is to be fastened.

Figure 10:
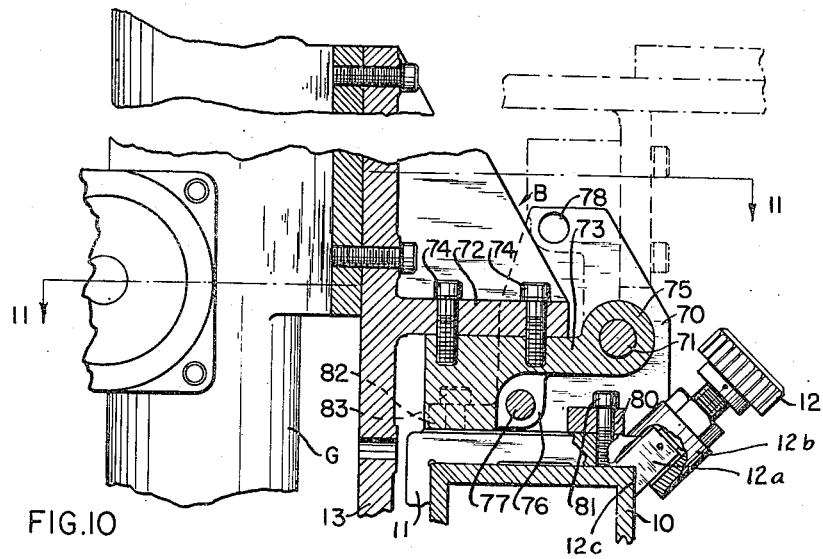
Fig. 10 is an enlarged transverse section through the special bracket that clamps the attachment to a part of the cutting machine.

The clamp portion 11 of the bracket has a screw 12 (Fig. 2) by means of which the bracket and hence the complete attachment can be locked in any position along the length of the torch bar 10 of the cutting machine. The clamp portion 11 shown in the drawings differs from similar clamps heretofore used for clamping parts to a square bar in that it is so constructed that it may be attached to the bar 10 at any place along the length of the bar without sliding it onto the bar from one end thereof. This, of course, is a great convenience when several torch holding attachments are to be attached to one bar. As shown in Fig. 2, the clamp portion 11 completely embraces only two corners of the bar 10, i. e., the lower left corner and the upper left corner. The part of the clamp portion that would ordinarily extend down over the right side face of the bar 10 is cut away as shown at 11'. Therefore, the clamp portion 11 can be applied to the bar 10 anywhere along the length of the bar by tilting it slightly forward and slipping it laterally onto the bar. As best shown in Fig. 10, the screw 12 is operatively connected to a movable jaw block 12a which slides along a diagonal axis in a part 12b of the clamp portion 11. The jaw block has an angular recess 12c to accommodate the upper right corner of the torch bar 10. Before the clamp portion 11 is slipped laterally onto the bar 10, as above described, the screw 12 is first turned to retract the movable jaw block 12a, and after the clamp portion is positioned on the bar the screw 12 is tightened to cause the jaw block 12a to embrace the upper right corner of the bar. The bar 10 will then be embraced at three of its corners, and the clamp portion 11 will be firmly clamped to the bar.

Figure 11:
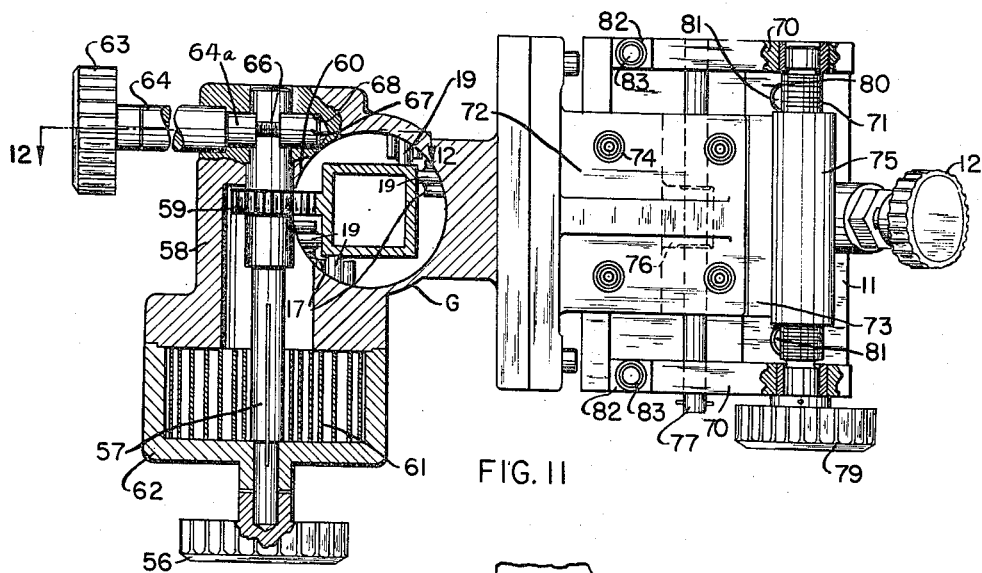
Fig. 11 is a section taken approximately along line 11—11 of Fig. 10.

The bracket B has a portion 13 (Fig. 2) which is pivoted to the clamp portion 11 of the bracket in the manner hereinafter described so that the entire attachment can be swung to an inoperative position. This portion 13 of the bracket has a flange 14 to which the above-mentioned guide box G is secured by means of bolts 15. The above-mentioned vertical bar V is preferably square in cross-section and is guided during its vertical movement by means of bearing units 16 in the guide box. Each bearing unit, as shown in Fig. 3, comprises a cylindrical block 17 held in an opening in the side wall of the guide box by means of a set screw 18. The block 17 has a bifurcated inner end in which a roller 19 is rotatably mounted. The roller bears against one face of the vertical bar V. There are four of these bearing units at the upper end of the guide box and four at its lower end, the four rollers at each end of the guide box engaging the four faces of the vertical bar V. The block 17 of each bearing unit can be adjusted by means of an adjusting screw 20 when the set screw 18 is loosened, whereby the desired lateral spacing of the vertical bar V within the guide box can be obtained. The adjusting screw 20 is mounted in a cover plate 21 which closes the outer end of the opening in which the roller block 17 is located. This cover plate is held in place by means of screws 22. As best shown in Fig. 11 the bearing units at each end of the guide box are arranged in two pairs, the two rollers 19 of one pair engaging two contiguous faces of the vertical bar V near one of its corners, and the two rollers of the other pair engaging the other two faces of the vertical bar near its diagonally opposite corner. This arrangement of the bearing rollers restrains the vertical bar V against rotational movement to a greater extent than if each roller engaged one of the sides of the vertical bar along a median line thereof.

Figure 7:
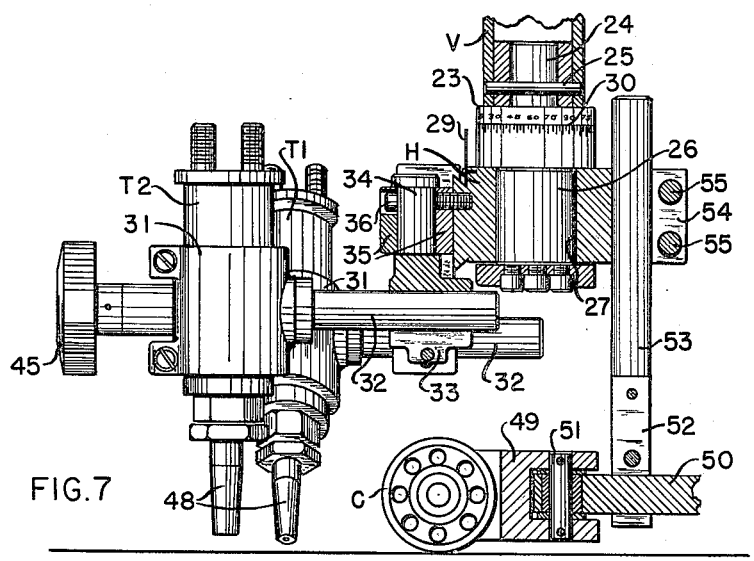
Fig. 7 is a vertical section taken approximately along line 7—7 of Fig. 4.

The above-mentioned horizontal guide bar H is supported at the lower end of the vertical guide bar V in the manner best shown in Figs. 6 and 7. The connection of the horizontal bar to the vertical bar is made through a coupling 23 having a neck portion 24 held in a socket in the lower end of the vertical bar V by a pin 25. A cylindrical shank portion 26 of the coupling is received in a clamp opening 27 in the horizontal bar and clamped therein by a screw 28 (Fig. 6). This clamping arrangement permits the horizontal bar H to be rotated in a horizontal plane on the vertical bar V to a new position when desired, when clamping screw 28 is loosened. A pointer 29 (Fig. 7) is secured to the horizontal bar H and cooperates with a scale 30 on the coupling 23 to indicate the adjusted position of the horizontal bar.

Figure 8:
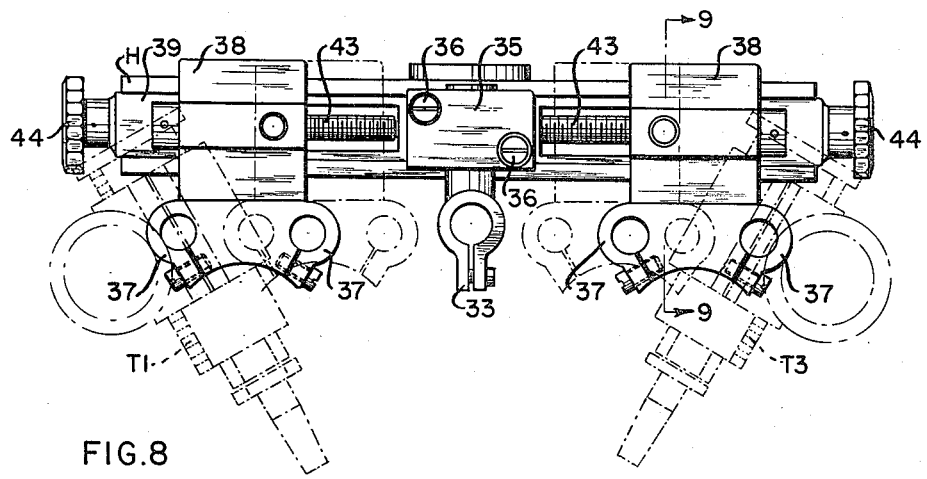
Fig. 8 is a front elevation of the horizontal guide bar on which the torch holders are mounted.

Each of the torches $T^1$, $T^2$ and $T^3$ is mounted in a sleeve-type torch holder 31 (Figs. 4, 6 and 7). Each torch holder has a horizontally extending rod 32 (Figs. 6 and 7). The rod 32 on the holder for the central torch $T^2$ is clamped in a split-sleeve clamp 33 (Figs. 6 and 7) at the lower end of a vertical stud 34. This stud is clamped between clamping plates 35 and to the middle portion of the bar H by means of screws 36 (Figs. 6, 7 and 8).

Figure 9:
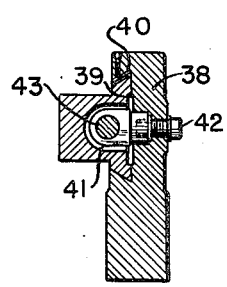
Fig. 9 is a transverse section taken approximately along line 9—9 of Fig. 8.

The horizontal rod 32 on each of the outer torch holders 31 is adapted to be received in either one or the other of two split clamps 37 (Fig. 8) carried by a plate 38 which is slidably mounted on the horizontal guide bar H by means of a dovetail guide 39 on the horizontal bar H fitting in a dovetail groove 40 in the rear face of the plate 38, as best shown in Fig. 9. A threaded collar 41 is secured to the rear of each of the two slide plates 38 by means of a screw 42. The collar 41 has threaded engagement with a shaft 43 extending longitudinally of the horizontal bar H and journaled in a recess therein. The outer end of each shaft 43 has a knob 44 secured to it by means of which the shaft can be turned to adjust the corresponding plate 38 to the desired position along the horizontal bar H. Adjustment of either plate 38 along the horizontal bar H in this manner adjusts the torch holder and the torch mounted in it transversely of the line of cut.

Each torch is adjustable lengthwise of itself in its holder 31 by turning a knob 45. This rotates a pinion 46 (Fig. 6) which meshes with a rack 47 on the torch (Fig. 4) and therefore moves the torch up or down to adjust the spacing of the torch tip 48 from the surface of the workpiece W (Fig. 4).

The above-mentioned caster wheel C is rotatably mounted in the bifurcated forward end of a bracket 49 (Fig. 7) which is swiveled to an arm 50 by means of a vertical pin 51. The arm 50 is clamped in a clamp 52 at the lower end of a vertical post 53 which in turn is gripped in a split clamp 54 forming part of the horizontal guide bar H. The clamp 54 has clamping screws 55 (see also Fig. 6) which when loosened permits post 53 to be adjusted vertically to thereby position the caster wheel C at the desired level with respect to the horizontal guide bar H. The caster wheel can also be adjusted forward or backward by sliding the arm 50 in the clamp 52. If desired, the post 53 and its clamp 52 may be turned 90° from the position shown in Fig. 7 so that the arm 50 will then extend transversely of the line of cut instead of parallel to it, and in this case the caster wheel will follow a path which is laterally off-set from the line of cut.

The vertical bar V, the horizontal bar H, and the group of torches carried by the horizontal bar, can be raised or lowered to the desired elevation by turning a knob 56 (Figs. 1, 2 and 11) connected to a shaft 57 (Fig. 11) journaled in a casing 58 forming part of the guide box G. The shaft 57 has secured to it a pinion 59 which meshes with rack teeth 60 on one face of the vertical bar V. Thus, turning of the knob 56 rotates the pinion 59 to raise or lower the vertical bar. One portion of the shaft 57 is surrounded by a coil spring 61, the inner end of which is attached to the shaft, and the outer end of which is attached to a cover portion 62 of the casing 58. Rotation of the shaft 57 in a clockwise direction to lower the vertical bar V winds the spring 61 more tightly and produces a greater counterclockwise torque on the shaft. Consequently, whenever the vertical bar V is lowered, the spring force reduces the apparent load of the mechanism operated by turning the knob 56 and lessens the effort required to raise the mechanism. The counterweight effect of the spring on the vertical bar V and the parts carried by it also provides a smoother floating action of the torches because irregularities on the work surface can raise the caster wheel easily without causing the vertical bar to bind. The smooth riding of the caster wheel over irregularities in work surface produced in this manner causes less drag on the machine and assists in the accurate movement of the torches along the work-piece.

Figure 12:
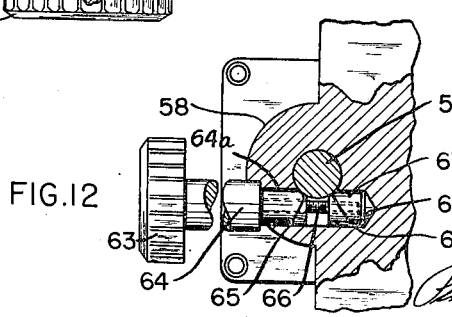
Fig. 12 is a section taken approximately along line 12—12 of Fig. 11.

A locking device is provided to clamp the pinion shaft 57 and hold the vertical bar V at any desired level to which it is raised. This locking device is operated by turning a knob 63 (Figs. 11 and 12) secured to the end of a short shaft 64 journaled in the casing 58. A threaded projection 66 on the shaft 64 is threadedly received in a cylindrical member 67 movable longitudinally in a drilled recess 68, and the threaded projection also passes freely through a second similar cylindrical member or collar 64a located at the inner end of the shaft 64. The two cylindrical members 64a and 67 are so arranged that their adjacent edges can grip the pinion shaft 57 between them. The two gripping edges of the cylindrical members 64a and 67 are respectively provided with chamfers or flats 65 and 69 (Fig. 12) which provide greater surface contact with the pinion shaft 57 and also prevent rotation of the two cylindrical members when the knob 63 is turned along with the shaft 64 and its threaded extension 66. Thus, when the knob 63 is turned in one direction, the cylindrical member 67 is moved longitudinally toward the cylindrical member 64a so that the pinion shaft 57 is gripped between the two chamfers or flats 65 and 69. This locks the pinion shaft 57 against turning and thereby prevents movement of the vertical bar V. Whenever desired, the torches may be moved away from the work-piece by turning the knob 56 until they are at the desired elevation and then the knob 63 may be turned to lock the pinion shaft 57 and thereby hold the torches in the elevated position. To lower the torches, the knob 63 is rotated in the opposite direction to release the pinion shaft 57 and the vertical bar V will then descend, either by its own weight or by rotation of the knob 56, until the caster wheel C comes in contact with the work surface. During this downward movement of the vertical bar V, the spring 61 will be wound more tightly as above described. The vertical bar V being now free to move vertically in the guide box G, the torches will have a floating action, the spacing of their tips from the surface of the work being maintained constant by the caster wheel regardless of irregularities in the work surface.

The details of the special bracket B which fastens the attachment to the part 10 of the cutting machine are best illustrated in Figs. 10 and 11. It has already been stated that the special bracket comprises a clamping portion 11 by which the bracket is clamped to the member 10 of the cutting machine, and a portion 13 which is pivoted to the clamping portion 11. The pivotal connection between the two portions is preferably effected by providing the clamping portion 11 with a pair of upright flanges 70, and journaling the ends of a horizontal threaded shaft 71 in the flanges, and by utilizing this shaft to hingedly connect the part 13 of the bracket to the clamping portion 11. The part 13 of the bracket has a horizontally extending web 72 to which a plate 73 is secured by means of bolts 74. The plate 73 has a sleeve portion 75 which is interiorly threaded to receive the threaded shaft 71. Thus, the part 13 of the bracket together with the entire attachment secured to it, can be swung about the axis of the shaft 71 from the full-line operative position shown in Fig. 10 to the dotted-line horizontal position. The plate 73 preferably has a boss 76 which has an opening extending through it. When the attachment is in the operative position it may be locked in this position by inserting a locking pin 77 through the opening in the boss and through aligned openings in the upright flanges 70 on the bracket. To move the attachment to its inoperative position the locking pin 77 must, of course, first be withdrawn and after the attachment has been moved to its inoperative position, it may be locked in that position by inserting the locking pin through the opening in the boss 76 and through another pair of openings in the upright flanges 70 of the bracket, one of which appears at 78 in Fig. 10.

It will be noted from Fig. 11 that the horizontally extending web 72 on the bracket portion 13, and the plate 73 to which it is bolted, are narrower than the threaded shaft 71 is long. This permits limited lateral adjustment of the plate 73, and all parts of the attachment connected to it, relative to the clamping portion 11 of the bracket when the shaft 71 is turned in its bearings by means of a knob 79.

The upright flanges 70 may be secured to the clamping portion 11 of the bracket in any suitable way. In the particular apparatus illustrated in the drawings, they are interconnected by a strut 80 which is secured to the clamping portion 11 of the bracket by screws 81, and each flange has a boss 82 secured to the clamping portion 11 by means of a screw 83.

Fig. 4 shows the three torches $T^1$, $T^2$ and $T^3$ arranged so as to produce a trimmed edge on the work-piece W having a double bevel and an intermediate land. The central torch $T^2$ is vertically disposed to produce the land while the outer torches $T^1$ and $T^3$ are inclined to cut a bevel above the land and an oppositely inclined bevel below the land.

Let it be assumed, for example, that a rough edged plate having a thickness of 1" is to be trimmed in preparation for welding and that it is desired to provide the plate with a double 45° bevel and a 1/8" land. The arrangement of the torches would then be substantially as shown in the schematic illustration of Fig. 5. The central torch $T^2$ is placed over the line along which the work-piece is to be cut to form the land and is located at a sufficient distance from the original edge of the work-piece to enable the outer torch $T^3$ to direct its cutting jet against the work-piece. When the line of cut of the center torch is thus determined, the outer torches are given the proper inclination to cut the bevels to the desired angles and are moved outwardly on the horizontal guide bar H to space the torches the proper distance depending upon the thickness of the work-piece and the desired width of the bevels and the land. It will be apparent from Fig. 5 that because of the land the center torch $T^2$ will be closer to the torch $T^1$ than to the torch $T^3$.

It will now be seen that the invention provides a single torch holding attachment adapted to hold a plurality of torches, preferably three, which can be clamped to the torch bar or some other part of a gas cutting machine, and which is capable of a large number of torch arrangements and adjustments without disturbing the main clamp that clamps the attachment to the cutting machine, whereby plate edge preparation of various types can be performed. Each torch is independently adjustable rectilinearly in its holder 31 by turning the knob 45 to position the torch tip the proper height above the work-piece, and each torch can be independently adjusted to the desired inclination by turning its holder about the axis of the holder's horizontal supporting rod 32. Moreover, each torch can be independently shifted forward or backward by rectilinear adjustment of its holder's horizontal supporting rod. Once each torch is adjusted to its correct vertical position in its holder and to its correct fore and aft position and correct inclination, its torch holder may be locked by tightening the clamp which receives the holder's horizontal supporting rod 32, and thereafter the torches may be adjusted laterally, either independently or as a group, without affecting the torch angles, their fore and aft adjustments, or the spacing of the tips from the work surface. The independent lateral adjustment of the outer torches is made by moving the plates 38, which carry their holders, along the horizontal guide bar H by turning the knobs 44 and the shafts 43 to which they are connected, and the independent lateral adjustment of the center torch is made by swinging its holder 31 laterally about the axis of the vertical stud 34. Adjustment of the plates 38 by means of the threaded shafts 43 provides a micrometer adjustment for the outer torches allowing slight corrective lateral movements of them to be made until the cut edge on the work-piece is satisfactory. If the outer torch holders are supported in the inner clamps on the adjustable plate 38 (Fig. 8) the lateral spacing of the outer torches may be increased further than the distance allowed by the outward movement of the adjustable plates by mounting the torch holders in the outer clamps of the plates. This makes it possible to cut double bevels on thicker work-pieces, since the greater the thickness of the work-piece the greater must be the lateral spacing of the torches if it is desired to have the bevels of the same width. The lateral adjustment of the torches simultaneously as a group is effected by turning the knob 79 on the shaft 71 mounted on the clamping bracket of the attachment (Fig. 11). Since the shaft 71 is a threaded shaft, this is a micrometer adjustment which provides for fine lateral adjustment of the group of torches to bring them into respective alignment with the several lines along which the torches are to cut. This adjustment can be made without disturbing the clamping portion of the bracket which clamps the attachment to the torch bar of the cutting machine.

All of the torches may be raised or lowered as a group by turning the knob 56 (Fig. 11), and the group of torches may be locked at any desired elevation by turning the locking knob 63.

In addition to the foregoing adjustments, the entire group of torches may be turned about a vertical axis by rotating the guide bar H in a horizontal plane on the end of the vertical bar V. This facilitates reorientation of the group of torches when it is desired to change the course of the cut. When cutting a rectangular plate, for instance, the horizontal guide bar H must be rotated through 90° at each corner, since it is apparent that the bar must be transversely disposed with respect to the line of cut or the bevels will not be cut to the desired angle. This adjustment may be made without affecting the relative positions of the torches, and therefore the changed course may be started without any new torch arrangement.

The entire attachment can be swung to an operative position in which the bar V is vertically disposed, or to an inoperative position in which it is substantially horizontal and parallel to the work surface by reason of the special construction of the bracket which clamps the attachment to the torch bar or other part of the cutting machine. When the bar V is swung to its inoperative horizontal position, it moves the group of torches away from the work-piece and to a position some distance above it. This facilitates shifting of the work-piece or the substitution of another work-piece, and also positions the torches so that the tip faces are readily accessible for cleaning and servicing. When the attachment is in its operative position with the bar V vertically disposed, the caster wheel C rides on the surface of the work-piece and moves all of the torches simultaneously as a group in response to irregularities in the work surface to keep the torch tips spaced a constant distance from the work surface, the caster wheel being adjustable vertically as above described to make the spacing the desired amount. Since the vertical bar V is constrained to move with a true rectilinear motion, the torches are restrained against any lateral movement when they are moved vertically by the caster wheel.

I claim:

1. A torch holding attachment for gas cutting machines comprising a bracket adapted to be clamped to a part of the cutting machine, a guide box secured to said bracket and having an opening extending vertically through it, a vertical bar movable rectilinearly in and guided by said guide box, a horizontal guide bar carried by the lower end of the vertical bar, a plurality of torch holders each having a horizontal rod, a gas torch mounted in each holder and having a tip directed downwardly, slides mounted on the horizontal guide bar in which the torch holder rods are clamped so that each rod can be rotated about its longitudinal axis to vary the inclination of the corresponding torch and so that each rod is adjustable rectilinearly to adjust the corresponding torch forward or backward, said slides being relatively adjustable lengthwise of and on said horizontal guide bar to vary the lateral spacing between the torches, means for so adjusting the slides comprising manually operable threaded shafts carried by said horizontal guide bar each having threaded connection with one of said slides, means for adjusting each torch vertically in its torch holder, and a work contacting element adapted to ride on the surface of the work and operatively connected to the vertical bar to move it in the guide box in response to irregularities in the work surface to keep the torch tips spaced a constant distance from the surface of the work.

2. A torch holding attachment for gas cutting machines comprising a horizontal guide bar, means for supporting the same from a part of the cutting machine, three torch holders supported by said horizontal guide bar each holder having a horizontal supporting rod, torches mounted in said holders each having a tip directed downwardly, means for adjusting each torch vertically in its holder, a vertical stud carried by the central portion of the horizontal guide bar so that it can be rotated about its own axis and having a clamp portion for receiving the horizontal supporting rod on the center torch holder, such rod being rotatable and also adjustable rectilinearly in said clamp portion, a pair of plates slidably mounted on the horizontal guide bar at opposite sides of said vertical stud each having a clamp portion to receive the horizontal supporting rod on one of the outer torch holders and in which such rod is rotatable and also adjustable rectilinearly, and means for independently adjusting each of said plates on the horizontal guide bar comprising two shafts rotatably mounted on the horizontal guide bar and each having threaded connection with one of the slide plates, and manually operable means for rotating each shaft.

3. A torch holding attachment in accordance with claim 2 having a vertical bar to the lower end of which said horizontal guide bar is connected, guiding means for said vertical bar permitting it to move vertically and guiding it in a rectilinear path, means for fastening said guiding means to a part of the gas cutting machine, and a work contacting element adapted to ride on the surface of the work and operatively connected to said vertical bar to move it rectilinearly in response to irregularities in the work surface to keep the torch tips spaced a constant distance from the surface of the work.

4. A torch holding attachment in accordance with claim 2 having a vertical bar to the lower end of which said horizontal guide bar is connected, the connection between the horizontal guide bar and the vertical bar permitting the horizontal guide bar to be rotatively adjusted in a horizontal plane about the axis of the vertical bar, guiding means for guiding the vertical bar rectilinearly, means for fastening said guiding means to a part of the gas cutting machine, and a work contacting element adapted to ride on the surface of the work and operatively connected to said vertical bar to move it rectilinearly in response to irregularities in the work surface to keep the torch tips spaced a constant distance from the surface of the work.

5. A torch holding attachment in accordance with claim 2 having a vertical bar to the lower end of which said horizontal guide bar is connected, the connection between the horizontal guide bar and the vertical bar permitting the horizontal guide bar to be rotatively adjusted in a horizontal plane about the axis of the vertical bar, guiding means for guiding the vertical bar rectilinearly, and a bracket for fastening said guiding means to a part of the gas cutting machine, said bracket comprising a portion secured to said guiding means and a clamping portion adapted to be clamped to said part of the cutting machine, the portion of the bracket that is secured to said guiding means being adjustable laterally on the clamping portion of the bracket.

6. A torch holding attachment in accordance with claim 2 having a vertical bar to the lower end of which said horizontal guide bar is connected, the connection between the horizontal guide bar and the vertical bar permitting the horizontal guide bar to be rotatively adjusted in a horizontal plane about the axis of the vertical bar, guiding means for guiding the vertical bar rectilinearly, and a bracket for fastening said guiding means to a part of the cutting machine, said bracket comprising a portion secured to said guiding means and a clamping portion adapted to be clamped to said part of the cutting machine, the two portions of the bracket being pivotally connected so that the attachment may be swung about a horizontal axis from its operative vertical position to an inoperative position in which said vertical bar is substantially horizontal and parallel to the work surface.

7. A torch holding attachment in accordance with claim 6 in which the portion of said bracket that is secured to said guiding means is adjustable laterally on the clamping portion of the bracket.

8. A torch holding attachment for gas cutting machines comprising a guide box having an opening extending vertically through it, means for attaching the guide box to a part of the gas cutting machine, a vertical bar movable rectilinearly in and guided by said guide box, at least one torch supported at the lower end of the vertical bar and having a tip directed downwardly, a work contacting element below the attachment adapted to ride on the surface of the work and operatively connected to the vertical bar to move it in the guide box in response to irregularities in the work surface to keep the torch tip or tips spaced a constant distance from the surface of the work, and manually operable means for raising and lowering the vertical bar comprising rack teeth on the vertical bar, a pinion shaft journaled in a portion of the guide box and having a pinion meshing with said rack teeth, and a coil spring surrounding the pinion shaft and having one end secured to the pinion shaft and the other end secured to a portion of the guide box so that the spring is wound more tightly when the pinion shaft is rotated to lower the vertical bar.

9. A torch holding attachment in accordance with claim 8 having means for locking said pinion shaft against rotation whereby the vertical bar may be held at any elevation to which it is moved by said manually operated means.

10. A torch holding attachment for gas cutting machines comprising a bracket adapted to be clamped to a part of the cutting machine, a guide box secured to said bracket and having an opening extending vertically through it, a vertical bar movable rectilinearly in and guided by said guide box, at least one torch supported at the lower end of the vertical bar and having a tip directed downwardly, and a work contacting element below the attachment adapted to ride on the surface of the work and operatively connected to the vertical bar to move it in the guide box in response to irregularities in the work surface to keep the torch tip or tips spaced a constant distance from the surface of the work, said bracket comprising a portion secured to the guide box of the attachment and a clamping portion adapted to be clamped to said part of the cutting machine, and means adjustably securing the portion of the bracket that is secured to the guide box on the clamping portion of the bracket for movement relative thereto in a horizontal direction substantially normal to a line joining said clamping portion and the vertical bar.

11. A torch holding attachment for gas cutting machines comprising a bracket adapted to be clamped to a part of the cutting machine, a guide box secured to said bracket and having an opening extending vertically through it, a vertical bar movable rectilinearly in and guided by said guide box, at least one torch supported at the lower end of the vertical bar and having a tip directed downwardly, and a work contacting element below the attachment adapted to ride on the surface of the work and operatively connected to the vertical bar to move it in the guide box in response to irregularities in the work surface to keep the torch tip or tips spaced a constant distance from the surface of the work, said bracket comprising a portion secured to the guide box of the attachment and a clamping portion adapted to be clamped to said part of the cutting machine, and means connecting said portions including a threaded shaft rotatably mounted in one portion but fixed against axial movement relative thereto and threadedly received in said other portion, said shaft extending in a horizontal direction substantially normal to a line joining said clamping portion and the vertical bar whereby the portion of the bracket that is secured to the guide box may be adjusted relative to the clamping portion of the bracket in a horizontal direction substantially normal to the line joining said clamping portion and the vertical bar.

JOHN H. W. BEGEROW.

References Cited in the file of this patent

UNITED STATES PATENTS

| Number | Name | Date |
| --- | --- | --- |
| 1,162,587 | Eimann | Nov. 30, 1915 |
| 1,207,916 | Hendericks | Dec. 12, 1916 |
| 2,015,329 | Anderson | Sept. 24, 1935 |
| 2,189,140 | Glaum, Jr. | Feb. 6, 1940 |
| 2,198,808 | Eskridge | Apr. 30, 1940 |
| 2,211,224 | Anderson | Aug. 13, 1940 |
| 2,293,853 | Rountree | Aug. 25, 1942 |
| 2,372,298 | Smith | Mar. 27, 1945 |
| 2,373,541 | Chelborg et al. | Apr. 10, 1945 |
| 2,401,721 | Chouinard | June 11, 1946 |
| 2,416,399 | McKiernan | Feb. 25, 1947 |
| 2,439,629 | Libby | Apr. 13, 1948 |
| 2,443,710 | Rountree | June 22, 1948 |
| 2,460,193 | Raudenkolb | Jan. 25, 1949 |
| 2,447,041 | Bucknam et al. | July 26, 1949 |
| 2,521,669 | Rountree | Sept. 5, 1950 |